United States Patent [19]
Williams

[11] Patent Number: 5,210,654
[45] Date of Patent: May 11, 1993

[54] RAPID DEFOCUSING SYSTEM FOR ELECTROMAGNETIC RADIATION REFLECTIVE CONCENTRATOR

[75] Inventor: Carl L. Williams, Abilene, Tex.
[73] Assignee: LaJet, S.A., Bulle, Switzerland
[21] Appl. No.: 784,945
[22] Filed: Oct. 31, 1991
[51] Int. Cl.⁵ ............................................. G02B 5/10
[52] U.S. Cl. .................................. 359/847; 359/846; 359/869
[58] Field of Search ................. 359/846, 847, 868, 869

[56] References Cited

U.S. PATENT DOCUMENTS

| | | |
|---|---|---|
| 2,952,189 | 9/1960 | Pajes. |
| 3,054,328 | 9/1962 | Rodgers. |
| 3,514,776 | 5/1970 | Mulready. |
| 3,623,796 | 11/1971 | Schweiger. |
| 4,033,676 | 7/1977 | Brantley, Jr. et al. |
| 4,288,196 | 9/1981 | Johnson, Jr. et al. |
| 4,312,326 | 1/1982 | Johnson, Jr. |
| 4,422,723 | 12/1983 | Williams, Jr. et al. |
| 4,598,482 | 10/1985 | Williams, Jr. et al. |
| 5,016,998 | 5/1991 | Butler et al. ............ 359/847 |

FOREIGN PATENT DOCUMENTS

| | | | |
|---|---|---|---|
| 58-208705 | 12/1983 | Japan | 359/847 |
| 60-114803 | 6/1985 | Japan | 359/847 |
| 61-159613 | 7/1986 | Japan | 359/847 |
| 0400445 | 10/1933 | United Kingdom. | |

Primary Examiner—Bruce Y. Arnold
Assistant Examiner—J. P. Ryan
Attorney, Agent, or Firm—Roylance, Abrams, Berdo & Goodman

[57] ABSTRACT

A system for rapidly defocusing a solar concentrator has a plurality of variably curved reflectors carried on a frame for concentrating energy toward a target. The reflectors have an elastic reflective membrane secured to a hollow housing and are focused by an evacuation assembly which draws the membrane into the housing and into a concave configuration. The defocusing system comprises an inflation assembly which rapidly inflates the housing, moving the membrane out of the focused position to an unfocused position. The inflation assembly reacts to a control mechanism and comprises compressed air stored at about 100 psi.

25 Claims, 3 Drawing Sheets

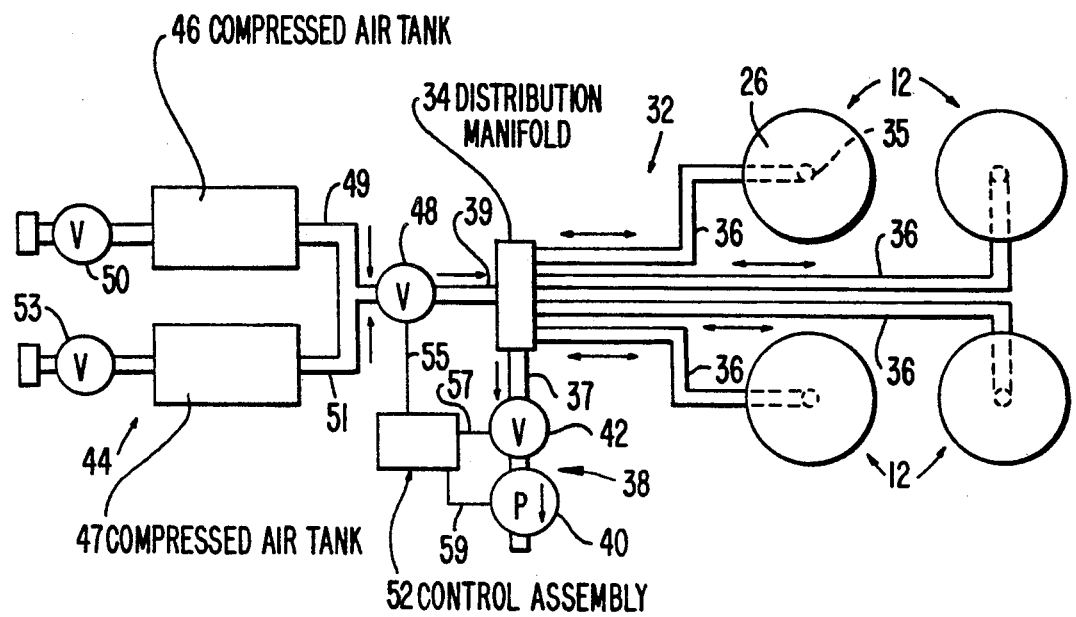

RAPID DEFOCUSING SYSTEM FOR ELECTROMAGNETIC RADIATION REFLECTIVE CONCENTRATOR

FIELD OF THE INVENTION

The invention relates to an electromagnetic radiation reflective concentrator using a variably curved reflector for focusing electromagnetic radiant energy, such as solar energy, onto a target. More particularly, the invention relates to a system for rapidly defocusing the reflector and thus dissipating the energy directed toward the target in cases of emergency. The reflector assembly has a flexible, elastic reflective membrane coupled to a housing, an evacuation mechanism for deflecting the membrane into the housing into a focused position, and an inflation mechanism for rapidly restoring pressure in the housing to move the membrane from the focused position to the unfocused position.

BACKGROUND OF THE INVENTION

Solar concentrators utilize lightweight, flexible reflective membranes to fabricate reflectors for focusing solar energy. A small negative pressure is applied to a cavity behind the reflective membrane, and the membrane is drawn into a curved configuration that approximates a paraboloid. When the reflector is pointed toward the sun, the solar radiation is concentrated at the focal point of the reflective membrane. The distance of the focal point depends upon the depth of curvature of the reflective membrane.

In one current design, 24 reflectors of 60-inch diameter each are mounted on a tracking structure to follow the relative movement of the sun. Solar energy is concentrated up to 5,000 times or more by the array of reflectors. Peak energy levels are in the order of 500 w/cm$^2$ and are very destructive when directed onto objects not designed to draw the energy from the radiated surface. The intense heat flux must be removed quickly from a targeted device when any number of conditions arise. Examples of these conditions are when the application device experiences a failure or over-limit condition, electrical power to the concentrator controller and drive motors is lost, a component on the concentrator is damaged or fails which prevents proper tracking of the sun, concentrator limit sensors indicate a hazard condition, or when there is risk to human safety.

To safely operate solar concentrators using the flexible membrane design, schemes have been developed to reduce the concentrated energy levels. One scheme is to move the tracking structure away from the direction of the sun; this approach is effective if the target surfaces can withstand exposure while the tracking system articulates. For those targeted systems unable to deal with continued exposure, for conditions that prevent movement of the concentrator's drive mechanisms, or where equipment or human safety is endangered, a rapid defocusing system is needed.

Examples of prior art reflectors are disclosed in the following U.S. Pat. Nos. 4,422,723 to Williams, Jr. et al; 2,952,189 to Pajes; 4,033,676 to Brantley, Jr. et al; 3,514,776 to Mulready; 3,054,328 to Rodgers; 3,623,796 to Schweiger; 4,288,146 and 4,312,326 to Johnson, Jr.; and 4,548,482 to Williams, Jr. et al; and British patent 400,445 to Wurzburger, the disclosure of which are hereby incorporated herein by reference.

Thus, there is a continuing need to provide a rapid defocusing system for solar concentrators.

SUMMARY OF THE INVENTION

A primary object of the present invention is to provide a system for defocusing a variably curved reflector rapidly.

Another object of the present invention is to provide a system which is reliable and responsive to emergency conditions.

A further object of the present invention is to provide a system that reacts to hazardous conditions.

A still further object of the present invention is to provide a system of defocusing which is both easy to use and safe.

The foregoing objects are attained by a reflector assembly comprising a hollow housing having a top opening; a flexible, elastic reflective membrane; a coupling mechanism for coupling the membrane over the top opening in a gas-tight manner; an evacuation assembly, coupled to the housing, for creating a partial vacuum in the housing and causing the membrane to deflect into the housing to a focused position from an unfocused position; and an inflation assembly, coupled to the housing for rapidly restoring pressure in the housing and causing the membrane to move from the focused position to the unfocused position.

Other objects, advantages, and salient features of the present invention will become apparent from the following detailed description, which, taken in conjunction with the annexed drawings, discloses preferred embodiments of the present invention.

As used in this application, the term "top" is intended to facilitate the description of the reflector. Thus, this term is merely illustrative of the reflector and is not intended to limit the reflector to any specific orientation.

BRIEF DESCRIPTION OF THE DRAWINGS

Referring to the drawings, which form a part of this original disclosure:

FIG. 2 is a schematic diagram of the overall system showing representative reflectors and the distribution system coupled to evacuation means and inflation means;

FIG. 3 is a side elevational view in section showing a reflector in the focused position with a partial vacuum created inside the housing;

FIG. 4 is a side elevational view in section of the reflector in the defocused position after the inflation means has restored pressure within the housing;

DETAILED DESCRIPTION OF THE INVENTION

Figure 1:
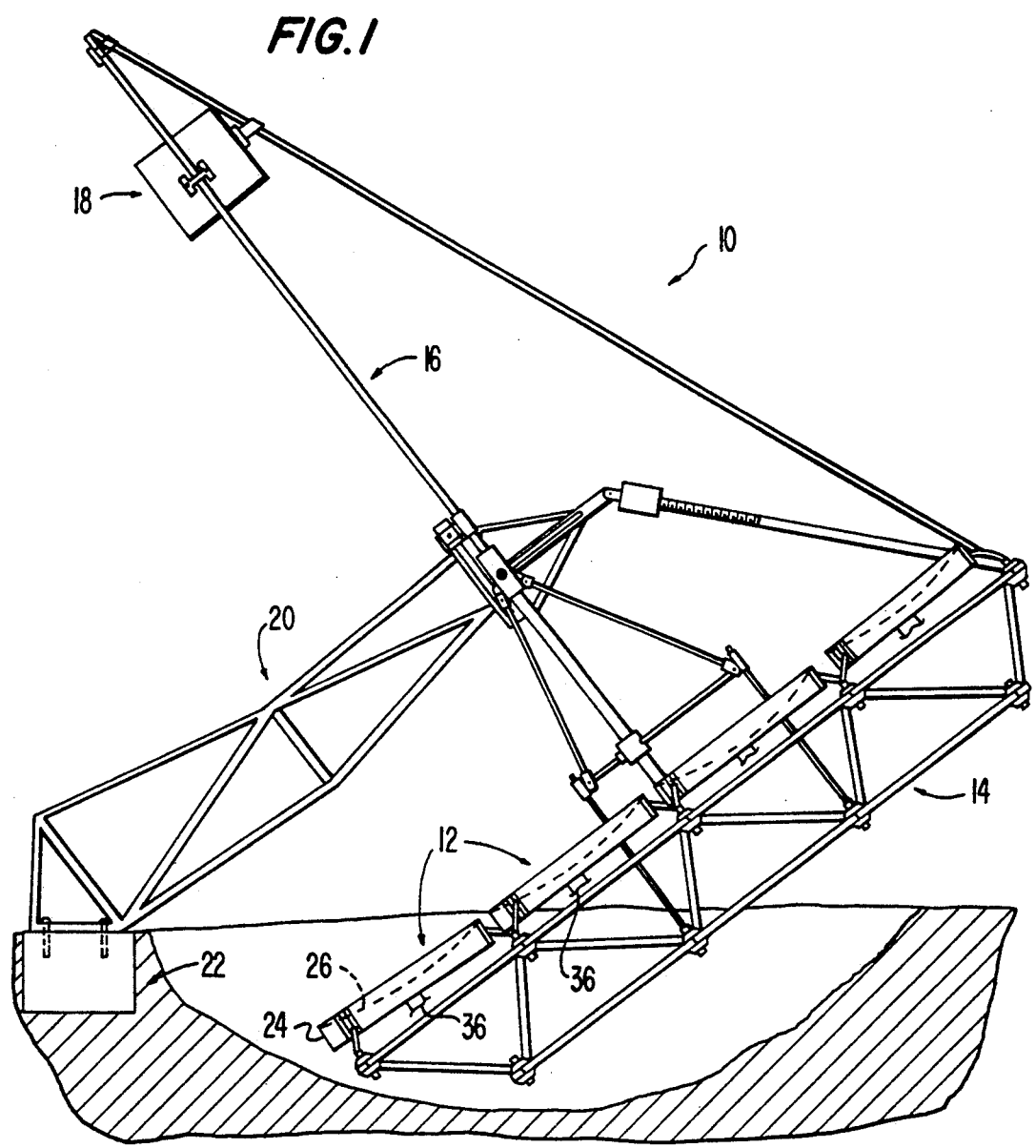
FIG. 1 is a side elevational view of a concentrator and variably curved reflectors in accordance with the present invention.
Figure 5:
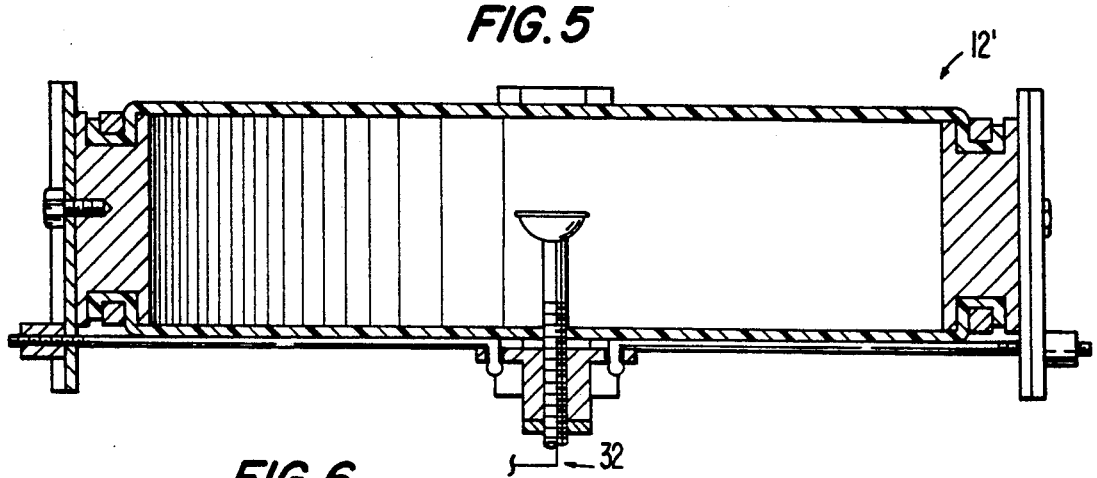
FIG. 5 is a side elevational view in section showing a reflector in defocused position with flexible backside, in accordance with another embodiment of the present invention.

As seen in FIG. 1, the electromagnetic radiation reflective concentrator 10 comprises a plurality of variably curved reflectors 12 coupled to a frame 14 suspended by an intermediate support 16. A target 18 is spaced from the reflectors along the intermediate support 16. The intermediate support 16 is carried by a cantilever beam 20 which is secured to a main support 22. The reflectors 12 and target 18 move as a unit with the intermediate support 16 to follow the source of electromagnetic radiation, e.g., the sun. The concentrator, therefore, can adjust to the sun's daily cycle and seasonal cycle. The structure broadly illustrated in FIG. 1 is disclosed in U.S. Pat. No. 4,312,326, the disclosure of which is hereby incorporated herein by reference.

The reflectors 12 are coupled via a distribution system 32 to an evacuation assembly 38 and an inflation assembly 44 for focusing and defocusing the reflectors as seen in FIGS. 3–4.

Each reflector 12, best seen in FIGS. 3 and 4, comprises a rigid, hollow tubular housing 24 having a top opening 25 over which a flexible, elastic, imperforate and lightweight reflective membrane 26 is secured. The reflective membrane 26 is secured to housing 24 in a gas-tight manner by coupling means in the form of a ring 28 received in annular groove 29 in the housing or some other means of attaching the membrane to the housing, such as bonding with an adhesive. The membrane is slightly stretched in its installation on the housing and has a normally flat, unfocused configuration as seen in FIG. 4 in which the plane of the membrane is substantially perpendicular to the longitudinal axis of the housing and located at the top and outside of the housing. Advantageously, the reflective membrane 26 is formed from an elastic, flexible piece of material, such as Mylar, which has a metalized reflective surface (silver or aluminum). The thickness of membrane 26 can be between about 0.0005 and about 0.01 inch.

Figure 6:
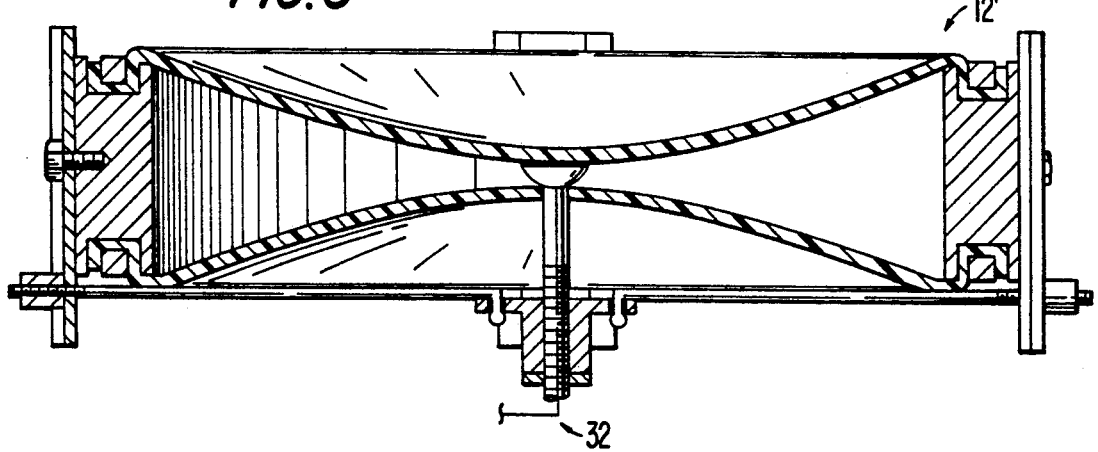
FIG. 6 is a side elevational view in section showing the reflector of FIG. 5 in the focused position with a flexible backside.

The reflector 12 also has a gas-tight rigid base 29, as shown in FIG. 4 or a flexible film base shown in FIG. 6, which has an aperture 30 therein, through which passes a tube 31. Tube 31 is threaded at one end and is threadedly coupled to a threaded nut 33 rigidly coupled to base 29 coaxial with aperture 30 to adjust the position of the tube. Tube 31 is coupled to fluid line 36 which is in turn coupled to evacuation pump 40, which will partially evacuate the interior of housing 24, i.e., lower the pressure therein. At the other end of the tube 31 is a cup 35 which communicates with the tube 31. By adjusting the height of the cup 35 in the housing, the amount of deflection into the housing of the reflective membrane 26 can be controlled. That is, once the housing is partially evacuated, the membrane will be deflected inwardly until it covers cup 35 as seen in FIG. 3, which prevents further evacuation and limits further deflection.

The reflectors 12 shown in FIGS. 2–4 are disclosed in U.S. Pat. No. 4,422,723, the disclosure of which is hereby incorporated herein by reference.

The distribution system 32 is shown schematically in FIG. 2. Each of the reflectors 12 is connected to a distribution tank or manifold 34 via a fluid line 36, which is connected to the interior of each reflector via tube 31. The distribution manifold 34 is the routing center for the evacuation assembly 38 and inflation assembly 44.

Evacuation assembly 38 comprises a vacuum pump 40 coupled to the distribution manifold 34 via fluid line 37. The assembly includes a conventional value 42 in line 37, such as a needle valve, a resticter valve, or a solenoid valve, to control the air flow into and out of the reflector 12. The evacuation assembly 38 operates on the reflector to create a partial vacuum in housing 24, thus deflecting membrane 26 to a focused position as seen in FIG. 3.

The inflation assembly 44 comprises a tank or tanks 46 and 47 containing compressed fluid, such as compressed air, coupled to distribution manifold 34 via fluid lines 39, 49, and 51. The flow of compressed fluid from tanks 46 and 47 is controlled by valve 48 in line 39. The supply of compressed fluid to tanks 46 and 47 is regulated by valves 50 and 53, which connect to a recharging source such as an air compressor. The inflation assembly 44 is sized in volume and pressure to fill the reflectors and eliminate the partial vacuum created by the evacuation assembly, but preferably not to overinflate the membranes.

The inflation assembly 44 also comprises a control assembly 52 which is coupled to and activates valve 48 via line 55 and advantageously can also be coupled to and deactivate valve 42 via line 57, pump 40 via line 59, or both. Lines 57 and 59 can be electrical, hydraulic, or pneumatic power lines or mechanical linkages.

Valve 48 can be a normally closed solenoid valve which stays closed when electrical power is present in the system, but which is opened via a spring when electrical power in the system is lost. In that event, control assembly 52 will merely be part of the overall electrical system distributing power to the valve 48. Similarly, valve 42 in the evacuation assembly 38 can be a normally open solenoid valve which stays open when electrical power is present in the system, but which is closed via a spring when electrical power in the system is lost. If so, control assembly 52 will again merely be part of the overall electrical system distributing power to valve 42, as well as pump 40 if desired.

Valve 42 can also be a normally open solenoid valve which is closed by a specific electrical signal or emergency electrical power, and valve 48 can be a normally closed solenoid valve which is opened by another specific electrical signal or emergency electrical power. In that case, control assembly 52 will be part of the standard or emergency electrical power system that closes valve 42 and opens valve 48.

Alternatively, valves 42 and 48 and pump 50 can be opened, closed, activated or inactivated manually when electrical power to the system is lost or when rapid defocusing of the reflectors is otherwise desired or required.

Control assembly 52 can also have conventional sensors to identify various criteria requiring rapid defocusing of the reflectors and can automatically open valve 48, close valve 42, and inactivate pump 40 via conventional electrical and mechanical systems.

Operation

The concentrator 10 focuses solar energy by activating the evacuation assembly 38 which creates a partial vacuum in the housing 24 of each reflector 12, thus drawing the flexible membrane 26 into the housing 24 from a flat to a concave configuration. The reflector 12 in the curved configuration as shown in FIG. 3 concentrates the radiation at the focal point of the reflective surface which is preferably target 18 shown in FIG. 1.

When defocusing is desired due to a predetermined event or conditions such as power failure or the endangerment of human safety, a signal (manual or automatic) is imparted to the control assembly 52 which controls valve 48 in the inflation assembly 44. Valve 48 is then activated to open the fluid line 39 and allow the compressed air to leave the tanks 46 and 47 and enter the distribution manifold 34. Likewise, control assembly 52 closes valve 42 and inactivates pump 40.

In the preferred embodiment, the flow of compressed air into the distribution system 32 is governed by a normally open electrically activated solenoid valve 48. The valve 48 restrains the air flow from the compressor tanks until an electrical signal is received from the control assembly 52 or until electrical power is lost. In the event that electrical control power is lost, the valve 48 opens under spring actuation to defocus the reflectors. When the compressed air is released into the distribution manifold 34, it travels through fluid lines 36, 39, 49, and 51 and inflates the reflectors 12, moving the elastic membrane 26 out of the concave configuration as shown in FIG. 3 to a significantly lessened concave configuration, a flat configuration as shown in FIG. 4, or a slight convex configuration, thus defocusing each of the reflectors.

The defocusing of the reflectors occurs very rapidly. The operation of the system from the initial signal to the control assembly, which activates the valve 48, opens the line, and allows the compressed air to inflate the reflectors and thus defocus the concentrator, requires only 3-5 seconds. This is significantly less time than required for moving the entire tracking structure of the concentrator or for allowing the flexible membrane to elastically return naturally by merely removing the vacuum source.

In the preferred embodiment, 24 reflectors 12 of 60-inch diameter are mounted on a tracking structure. Solar energy is concentrated up to 5,000 or more times by the array of reflectors. Given a thickness of metalized Mylar of 0.0005 to 0.01 inch and a 60-inch diameter, it would naturally take 45 minutes to one hour to restore each reflective membrane to its unfocused position, as shown in FIG. 4, at ambient pressure of one atmosphere, i.e., 14.7 psi, since Mylar does not have a significant elastic restoration force and the distribution system is air tight with very low leakage. Using the present invention, the compressed fluid tank is sized to hold compressed air at 100 psi or more and will restore the reflector from a focused position as shown in FIG. 3 in 1/1000 of the time required for the membrane to naturally reassume its flat configuration as shown in FIG. 4.

The magnitude of the rate of defocusing using the subject of invention will decrease exponentially from the point of initiation to the point of pressure equilibrium. The compressed fluid tank is sized in volume and pressure to provide a proper volume of fluid to the reflectors for adequate defocusing after the tank is opened to the distribution system. An external compressor system is used to recharge the compressed fluid tanks after the valve has been reset. The compressed fluid tank is also sized to limit the volume of expanded fluid to prevent over inflation and potential damage to the reflectors.

As discussed above, the activation of the subject invention can be initiated manually, by a control means, or from loss of drive power. Operators can defocus the reflectors for emergency reasons or as a routine system shutdown. Manual activation can be initiated by button activation at the concentrator, in the control room, or any other other designated location. In response to warnings, over temperature conditions, system malfunctions, and other directed operations, the concentrator controller can initiate defocusing under automatic control. Engine controllers, steam flow control systems, and fluid flow indicators associated with the target can be configured to activate the defocusing system also. Loss of electrical power to the concentrator controller and drive motors results in cessation of sun tracking which allows the focused solar image to drift across structure as the earth rotates (solar walk-off). Solar walk-off results in destruction of any uncooled surface in the path of the focused image. The defocusing system activates upon loss of electrical power and prevents such destruction.

While only two preferred embodiments have been chosen to illustrate the invention, it will be understood by those skilled in the art that various changes and modifications can be made therein without departing from the scope of the invention, as defined in the appended claims.

What is claimed is:

1. A reflector assembly comprising:
   a hollow housing having a top opening;
   a flexible, elastic reflective membrane;
   coupling means for coupling said membrane over said top opening in a gas-tight manner;
   evacuation means, coupled to said housing, for creating a partial vacuum in said housing and causing said membrane to deflect into said housing to a focused position from an unfocused position; and
   inflation means, coupled to said housing, for rapidly restoring pressure in said housing and causing said membrane to move from said focused position to said unfocused position, said inflation means including compressed fluid means for rapidly supplying a fluid with a pressure greater than atmospheric pressure to said housing.

2. A reflector assembly according to claim 1, and further comprising
   control means for controlling said evacuation means and said inflation means.

3. A reflector assembly according to claim 1, wherein said evacuation means comprises a vacuum pump.

4. A reflector assembly according to claim 1, and further comprising
   distribution means for coupling said evacuation means and said inflation means to said housing.

5. A reflector assembly according to claim 4, wherein said distribution means comprises
   a fluid line; and
   valve means for restricting flow of fluid through said fluid line.

6. A reflector assembly according to claim 5, wherein said valve means comprises
   a solenoid valve for restricting flow of a fluid from said inflation means, said valve allowing flow of a fluid through said fluid valve upon a predetermined event.

7. A reflector assembly according to claim 5, wherein said valve means is spring activated.

8. A reflector assembly according to claim 1, wherein said inflation means moves said membrane from said focused position to said unfocused position in substantially 5 seconds or less.

9. A reflector assembly according to claim 1, wherein said inflation means moves said membrane from said focused position to said unfocused position in substantially less than 45 minutes.

10. A reflector assembly according to claim 1, wherein
    said inflation means moves said membrane from said focused position to said unfocused position substantially 1,000 times faster than said membrane would naturally move from said focused position to said unfocused position by the force of its elasticity.

11. A reflector assembly comprising:
a hollow housing having a top opening;
a flexible, elastic reflective membrane;
coupling means for coupling said membrane over said top opening in a gas-tight manner;
evacuation means, coupled to said housing, for creating a partial vacuum in said housing and causing said membrane to deflect into said housing to a focused position from an unfocused position; and
inflation means, coupled to said housing, for rapidly restoring pressure in said housing and causing said membrane to move from said focused position to said unfocused position, said inflation means including a tank, and compressed fluid held within said tank.

12. A reflector assembly according to claim 11, wherein
said tank holds said compressed fluid at substantially 100 psi.

13. A reflector assembly according to claim 11, wherein
said tank is sized in volume and pressure to substantially fill said housing with compressed fluid and move said membrane from said focused position to said unfocused position.

14. A reflector assembly according to claim 11, and further comprising
valve means, coupled to said tank, for controlling injection of said compressed fluid into said tank.

15. A reflector assembly according to claim 11, wherein
said compressed fluid is air.

16. A reflector assembly for concentrating energy toward a target, the combination comprising:
a frame;
a plurality of reflectors coupled to said frame;
a target spaced from said plurality of reflectors;
evacuation means, coupled to each of said reflectors, for concentrating energy reflected from said reflectors toward said target; and
inflation means, coupled to each of said reflectors, for rapidly deconcentrating energy reflected from said reflectors toward said target, said inflation means including compressed fluid means for rapidly supplying a fluid with a pressure greater than atmospheric pressure to said reflectors.

17. A reflector assembly according to claim 16, wherein
said compressed fluid means comprises a tank filled with compressed fluid.

18. A reflector assembly according to claim 16, and further comprising
control means for controlling said evacuation means and said inflation means.

19. A reflector assembly for concentrating energy toward a target, the combination comprising:
a frame;
a plurality of reflectors coupled to said frame;
a target spaced from said plurality of reflectors;
evacuation means, coupled to each of said reflectors, for concentrating energy reflected from said reflectors toward said target, said evacuation means comprises a vacuum source;
inflation means, coupled to each of said reflectors, for rapidly deconcentrating energy reflected from said reflectors toward said target, said inflation means comprises a compressed fluid source;
distribution means having fluid lines coupled between said plurality of reflectors and said vacuum source and said compressed fluid source; and
valve means, coupled to said distribution means, for selectively restricting flow of fluid from said vacuum source and said compressed fluid source;
whereby said inflation means causes each of said reflectors to deconcentrate energy reflected from said reflectors to said target in substantially less than 45 minutes.

20. A method of rapidly defocusing a solar concentrator using an elastic reflective membrane, comprising the steps of:
storing a fluid under compression;
creating a partial vacuum adjacent the elastic reflective membrane to deflect the membrane into a concave focused configuration; and
conveying the fluid stored under compression into contact with the membrane to eliminate the concave focused configuration of the membrane.

21. A method according to claim 20, wherein
the storing step includes storing the fluid under compression at substantially 100 psi.

22. A method according to claim 20, wherein
the discontinuing and conveying step includes eliminating the concave focused configuration of the membrane in about 3 to 5 seconds.

23. A method of rapidly defocusing a solar concentrator using an elastic reflective membrane, comprising the steps of
storing a fluid under compression;
creating a partial vacuum adjacent the elastic reflective membrane to deflect the membrane into a concave focused configuration; and
discontinuing creation of the partial vacuum adjacent the elastic reflective membrane and conveying the fluid stored under compression into contact with the membranes to eliminate the concave focused configuration of the membrane.

24. A method according to claim 23, wherein
the storing step includes storing the fluid under compression at substantially 100 psi.

25. A method according to claim 23, wherein
the discontinuing and conveying step includes eliminating the concave focused configuration of the membrane in about 3 to 5 seconds.

* * * * *